United States Patent [19]

Allen et al.

[11] 4,278,640

[45] Jul. 14, 1981

[54] METHOD FOR SOLVENT EXTRACTION OF METALLIC MINERAL VALUES FROM ACIDIC SOLUTIONS

[75] Inventors: Hanceford L. Allen, Bartow; William W. Berry, Lakeland, both of Fla.

[73] Assignee: International Minerals & Chemical Corporation, Northbrook, Ill.

[21] Appl. No.: 22,218

[22] Filed: Mar. 19, 1979

[51] Int. Cl.$^3$ .......................................... C01B 25/234
[52] U.S. Cl. ....................................... 423/10; 423/24; 423/112; 423/139; 423/321 R; 423/321 S
[58] Field of Search .................... 423/10, 24, 112, 139, 423/321 R, 321 D; 210/44

[56] References Cited

U.S. PATENT DOCUMENTS

| | | | |
|---|---|---|---|
| 3,630,711 | 12/1971 | Burkert et al. | 423/302 |
| 3,711,591 | 1/1973 | Hurst et al. | 423/10 |
| 3,769,207 | 10/1973 | Baer | 210/44 |
| 4,087,512 | 5/1978 | Reese et al. | 423/321 R |

FOREIGN PATENT DOCUMENTS 2278628  2/1976  France .

OTHER PUBLICATIONS

Angelidou et al., "The Removal of Emulsified Oil Particles . . . ", *Ind. Eng. Chem., Process Des. Dev.*, vol. 16, No. 4 (1977), pp. 438–441.

*Manual on Disposal of Refinery Wastes, Volume on Liquid Wastes,* Chpt. 9 (1969).

*Primary Examiner*—Deborah L. Kyle
*Attorney, Agent, or Firm*—Schuyler, Banner, Birch, McKie & Beckett

[57] ABSTRACT

Solvent extraction of metallic mineral values from aqueous acidic solutions is improved by introducing a fine dispersion of air bubbles into the acid-extractant mixture to cause solid material normally occurring at the phase interface to float to the surface. This improved process is particularly applicable to the extraction of uranium from wet process phosphoric acid.

11 Claims, No Drawings

METHOD FOR SOLVENT EXTRACTION OF METALLIC MINERAL VALUES FROM ACIDIC SOLUTIONS

The present invention relates to a method for extracting metallic mineral values from an acidic solution containing such values. In a particular aspect, the invention relates to an improved method for extracting uranium values from phosphoric acid solutions.

Valuable metals generally occur naturally in an oxidized state in ores containing appreciable quantities of other inorganic and/or organic materials. After such ores are mined from the earth, they are treated by a variety of physical and chemical processes to extract the valuable mineral in maximum purity and yield. Typically, initial ore processing steps include comminution and leaching with acid solutions. Additionally, the desired mineral values may become dissolved in acidic solutions as a result of various other known ore processing techniques. An acid leach solution containing dissolved mineral values and various soluble contaminants is then treated to selectively extract the valuable mineral values. Several methods have been devised for the extraction of particular mineral values, but the method to which the present invention is applicable involves the solvent extraction of the desired mineral values with an immiscible organic extractant.

Uranium ores are frequently treated in the described manner and, to a lesser extent, so are beryllium, nickel and copper ores. Acid solutions formed during initial ore processing are generally derived from a strong mineral acid such as sulfuric acid, hydrochloric acid, nitric acid or phosphoric acid. Immiscible organic extractants normally used in these acid systems include alkylamines and organophosphorous compounds such as di(2-ethylhexyl) phosphoric acid, dodecylphosphoric acid and octyl phenyl phosphoric acid.

Uranium is also present in small amounts in certain phosphate rock deposits which are mined for the production of phosphoric acid. Recovery of such uranium is desirable if recovery can be conducted in an economically feasible manner. "Wet process" phosphoric acid is conventionally prepared by acidulating phosphate rock (which contains calcium phosphate) with sulfuric acid to produce phosphoric acid and insoluble calcium sulfate (gypsum). It has been found that the uranium present in the phosphate rock is solubilized during the acidulation process and is carried into the phosphoric acid. One process which has been developed for extracting uranium from wet process phosphoric acid employs a synergistic mixture of di(2-ethylhexyl) phosphoric acid (DEPA) and trioctylphosphine oxide (TOPO) dissolved in a liquid hydrocarbon carrier such as kerosene. This process is disclosed in U.S. Pat. No. 3,711,591, Hurst, F. J. et al, Jan. 16, 1973, incorporated herein by reference.

In the selective solvent extraction of metallic mineral values from acidic solutions obtained in ore processing, the efficient separation of the barren aqueous acid phase from the pregnant organic extractant phase is often substantially hindered by the presence of solid material (called crud) which accumulates at the interface between the two phases. The exact composition of these solids may not be known, but they are thought to comprise organic material (generally called humates) and colloidal inorganic salts derived from impurities originally present in the ore or introduced during subsequent ore processing.

In a typical solvent extraction process the mineral values are recovered from the acid phase by a countercurrent extraction operation in which process a number of extraction stages comprising a mixer and settler are arranged in series. The two phases continuously move, in opposite directions, from one extraction stage to the next. Continuous movement of both phases results in an increased efficiency in the extraction process. In such a process, however, the problems associated with crud build-up at the phase interface in the settler are particularly troublesome, especially in the first extraction stage. The normal methods for removing this material, e.g., by drawing off the interface layer or by raising the interface and feeding the material forward out of the system, are batch type operations and disrupt the continuous flow of materials and lower the process efficiency. Another method employed to remove the crud layer at the interface involves the periodic injection of air (with a lance) into the interface area in the settler to cause the crud layer to break up and sink. This method also interferes with efficient operation of the process.

Accordingly, there is a need for a method which could eliminate the harmful effects of interfacial crud build-up in solvent extraction processes for recovering metallic values from acidic solution without interfering with the efficiency of the extraction process.

In accordance with the present invention, there is provided an improvement in a process for recovering metallic mineral values from an aqueous acidic solution obtained by processing an ore containing said values in admixture with other inorganic and/or organic constituents, which process includes the steps of mixing said aqueous acidic solution with an immiscible organic extractant to form a two-phase mixture, allowing said two-phase mixture to separate into a lighter phase and a heavier phase, said separated phases having an interfacial region therebetween, said interfacial region containing an accumulation of solid particles of impurities derived from the inorganic and/or organic constituents originally present in said ore or introduced by subsequent ore processing, the improvement comprising introducing air bubbles into said two-phase mixture to form a dispersion of bubbles which contact and adhere to said solid particles and cause said particles to rise to the surface of said lighter phase rather than accumulate in said interfacial region.

While the process of the present invention is broadly applicable to improving the extraction of mineral values from acidic solutions with an immiscible organic extractant, this process finds particular utility in the extraction of uranium from wet process phosphoric acid. Accordingly, the invention will be described with reference to this uranium extraction process.

In the conventional uranium extraction scheme wet process phosphoric acid (containing uranium) and an organic extractant are fed to a mixing zone where the mixture is agitated to provide intimate contact between the two phases. After mixing for a time sufficient for extraction of the uranium into the organic phase, the mixture is forwarded to a settling zone where the phases are allowed to separate. The lighter organic phase is then drawn off and further treated as necessary, e.g., by re-extraction for recovery of the uranium therefrom. In a countercurrent extraction operation, a plurality of mixing and settling vessels are employed and the acid phase and organic phase move through the operation in opposite directions. The solid material (crud) which accumulates at the phase interface in the settler after the phases have separated is particularly undesirable in a continuous countercurrent extraction operation because of build-up in the system.

It has been found that if air bubbles are introduced into the mixing zone in such a way that the bubbles remain in finely dispersed form, then the bubbles adhere to the solid material in the mixer, and cause it to float to the surface in the settler where it can be conveniently and continuously removed, e.g., by skimming.

The air is advantageously introduced through a sparger so as to form fine bubbles. In order to achieve the requisite dispersion of air bubbles in the mixer the air preferably is introduced into one of the mixer feed streams before mixing. Selection of the proper feed stream will vary with the nature of the aqueous and organic phases. Generally, the most uniform air bubble dispersion can be achieved by injecting air into the organic feed stream before it enters the mixer. If the aqueous phase is relatively clean, e.g., "green" phosphoric acid, the bubbles may coalesce before they have a chance to contact and adhere to the solid material in the mixer. Some aqueous systems, e.g., "brown" phosphoric acid, may be able to support a fine bubble dispersion without coalescing.

The rate at which the air is introduced is not critical and can be adjusted so that the maximum amount of solid material is removed by flotation. Determination of an appropriate air flow rate will involve consideration of a number of conditions, such as the amount of solid material to be removed, its floatability, the sparger design, temperature, volume of liquid, mixing rate, etc. The rate is easily determined, however, by varying it and observing the effects on the flotation of the solid material. In typical uranium extraction operation, a flow rate of up to about 0.4 cfm air per gallon of organic feed to the mixer has been satisfactorily employed. Preferred air flow rates for this system are from about 0.1 to 0.2 cfm/gal. Mixing of the air-containing two-phase mixture can be accomplished in the same general manner employed in conventional mixing operations. Typically, the mixture is subjected to agitation for periods of from about 1 to 3 minutes. Similarly, conventional settling equipment design and operating parameters may be employed in the practice of the process of the present invention.

In a continuous countercurrent extraction system, sparged air may be introduced in all of the extraction stages; however, sparging in only the first one or two stages is often sufficient to remove the majority of the solid material.

The present invention significantly improves solvent extraction process operabilities, and particularly facilitates the continuous countercurrent extraction of uranium values from wet process phosphoric acid. This process improvement may, in turn, lead to higher overall uranium recoveries.

As used herein, the term air is intended to broadly encompass any gas which effectively floats the solid material and which does not otherwise deleteriously affect the process.

The following specific example is intended to illustrate more fully the nature of the present invention without acting as a limitation on its scope.

EXAMPLE

This example demonstrates the effect of air sparging on the continuous countercurrent solvent extraction of uranium from wet process phosphoric acid with an organic extractant, consisting of a synergistic mixture of di(2-ethylhexyl) phosphoric acid and trioctylphosphine oxide dissolved in kerosene.

The extraction unit consisted of a number of stages each having a 2-foot diameter mixing vessel equipped with a stirrer and a 4-foot diameter settler vessel equipped with a continuous skimmer. Separate organic and aqueous streams were fed to the mixer at the following rates: organic 5 gpm; aqueous 10 gpm. The mixture was continuously discharged from the mixer after a residence time of about 2 minutes and forwarded to the settler. In the settler the pregnant organic extractant was continuously removed from the upper layer and the stripped phosphoric acid was removed from the lower layer. The system was stabilized and solid material built up at the phase interface to a thickness of about two inches. Then the operation was modified by injecting air at a flow rate of about 1 cfm into the organic feed to the mixer. Immediately, large volumes of the solid material floated to the surface of the settler and were skimmed. Within a matter of minutes, the interface was cleaned.

While certain specific embodiments of the invention have been described with particularity herein, it will be recognized that various modifications thereof will occur to those skilled in the art. Therefore, the scope of the invention is to be limited solely by the scope of the appended claims.

We claim:

1. In a process for recovering metallic mineral values from an aqueous acidic solution obtained by processing an ore containing said values in admixture with other inorganic and/or organic constituents, which process includes the steps of mixing said aqueous acidic solution with an immiscible organic extractant to form a two-phase mixture, allowing said two-phase mixture to separate into a lighter phase and a heavier phase, said separated phases having an interfacial region therebetween, said interfacial region containing an accumulation of solid particles of impurities derived from the inorganic and/or organic constituents originally present in said ore or introduced by subsequent ore processing, the improvement comprising introducing air bubbles into said two-phase mixture to form a dispersion of bubbles which contact and adhere to said solid particles and cause said particles to rise to the surface of said lighter phase rather than accumulate in said interfacial region.

2. The process of claim 1 additionally comprising the step of removing said solid particles from the surface of said lighter phase.

3. The process of claim 1 wherein said air bubbles are introduced into said two-phase mixture by sparging air into the organic extractant phase before it is mixed with the aqueous acid phase.

4. The process of claim 1 wherein said air bubbles are continuously introduced into said two-phase mixture at a rate sufficient to cause substantially all of said solid particles to rise to the surface of said lighter phase.

5. The process of claim 1 wherein said metallic mineral values are mineral values of metals selected from the group consisting of uranium, beryllium, nickel, copper and mixtures thereof.

6. The process of claim 1 wherein said aqueous acidic solution is selected from the group consisting of sulfuric acid, hydrochloric acid, nitric acid and phosphoric acid.

7. The process of claim 1 wherein said immiscible organic extractant comprises a mixture of a liquid hydrocarbon carrier and an extraction agent selected from the group consisting of di(2-ethylhexyl) phosphoric acid, dodecylphosphoric acid, octyl phenyl phosphoric acid and a synergistic mixture of di(2-ethylhexyl) phosphoric acid and trioctylphosphine oxide.

8. The process of claim 1, 2, 3, 4, 5, 6 or 7 wherein said mineral values are uranium values and said aqueous acidic solution is wet process phosphoric acid.

9. A process for recovering uranium values from wet process phosphoric acid comprising the steps of:
(a) mixing wet process phosphoric acid and an immiscible organic extractant comprising a liquid hydrocarbon carrier containing an extraction agent selected from the group consisting of di(2-ethylhexyl) phosphoric acid, dodecylphosphoric acid, octyl phenyl phosphoric acid and a synergistic mixture of di(2-ethylhexyl) phosphoric acid and trioctylphosphine oxide in a mixing zone to form a two-phase mixture;
(b) introducing air bubbles into said two-phase mixture to form a dispersion of bubbles which contact and adhere to solid impurities in said mixture;
(c) transferring said two-phase mixture to a settling zone and allowing said two-phase mixture to separate into a lighter phase and a heavier phase, said bubbles causing said solid impurities to rise to the surface of said lighter phase in said settling zone; and
(d) removing the solid impurities from the surface of said lighter phase.

10. The process of claim 9 wherein said air bubbles are introduced into said two-phase mixture by sparging air into said organic extractant before it is introduced into said mixing zone.

11. The process of claim 10 wherein said solid impurities are continuously removed from the surface of said lighter phase.

* * * * *